(12) United States Patent
Way

(10) Patent No.: US 6,788,899 B2
(45) Date of Patent: Sep. 7, 2004

(54) DYNAMIC WAVELENGTH ADD/DROP MULTIPLEXER FOR UDWDM OPTICAL COMMUNICATION SYSTEM

(76) Inventor: Winston I. Way, c/o Opvista, Inc., 3 Jenner, Suite 180, Irvine, CA (US) 92618

( * ) Notice: Subject to any disclaimer, the term of this patent is extended or adjusted under 35 U.S.C. 154(b) by 659 days.

(21) Appl. No.: 09/814,929

(22) Filed: Mar. 23, 2001

(65) Prior Publication Data

US 2002/0135838 A1 Sep. 26, 2002

Related U.S. Application Data

(60) Provisional application No. 60/231,577, filed on Sep. 11, 2000.

(51) Int. Cl.[7] ............................................... H04J 14/02
(52) U.S. Cl. ........................ 398/83; 398/56; 398/183; 398/79; 398/87; 398/54; 398/74; 398/24; 385/37; 385/16; 385/24; 385/43
(58) Field of Search ............................ 398/83, 85, 87, 398/183–188, 192, 200, 187, 68, 69, 124, 127, 133

(56) References Cited

U.S. PATENT DOCUMENTS

| | | | | |
|---|---|---|---|---|
| 5,600,466 A | * | 2/1997 | Tsushima et al. | 398/79 |
| 5,764,821 A | * | 6/1998 | Glance | 398/59 |
| 5,786,913 A | * | 7/1998 | Pfeiffer | 398/83 |
| 5,822,095 A | | 10/1998 | Taga et al. | |
| 5,940,197 A | * | 8/1999 | Ryu | 398/83 |
| 5,982,518 A | | 11/1999 | Mizrahi | |
| 6,201,909 B1 | * | 3/2001 | Kewitsch et al. | 385/37 |
| 6,208,441 B1 | * | 3/2001 | Jones et al. | 385/24 |
| 6,211,980 B1 | * | 4/2001 | Terahara | 398/82 |
| 6,222,654 B1 | * | 4/2001 | Frigo | 398/83 |
| 6,285,479 B1 | * | 9/2001 | Okazaki et al. | 398/56 |
| 6,339,663 B1 | * | 1/2002 | Leng et al. | 398/79 |
| 6,404,535 B1 | * | 6/2002 | Leight | 398/183 |
| 6,525,857 B1 | | 2/2003 | Way et al. | |
| 6,580,537 B1 | * | 6/2003 | Chang et al. | 398/79 |

* cited by examiner

Primary Examiner—Leslie Pascal
Assistant Examiner—Chau M Nguyen
(74) Attorney, Agent, or Firm—Fish & Richardson P.C.

(57) ABSTRACT

A method and device for optical add/drop is disclosed. The add/drop splits an input signal into two portions. The first portion is optically filtered to remove the channels, leaving an unmodulated carrier which is modulated with the newly added information. The second portion is split again into the through channels and a channel to be dropped. The dropped channel is detected or terminated and the through channels are recombined with the newly added channel to form an output optical signal. If desired, multiple channels may be dropped at the add/drop node. A dense wavelength division multiplexed (DWDM) optical communication system incorporating the add/drop node is also disclosed.

22 Claims, 5 Drawing Sheets

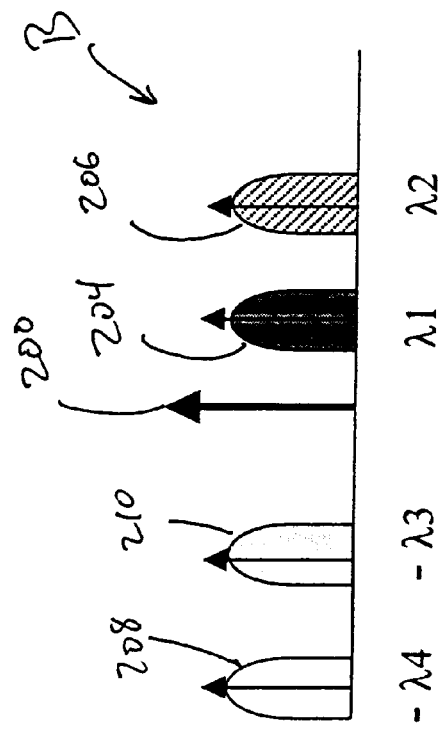
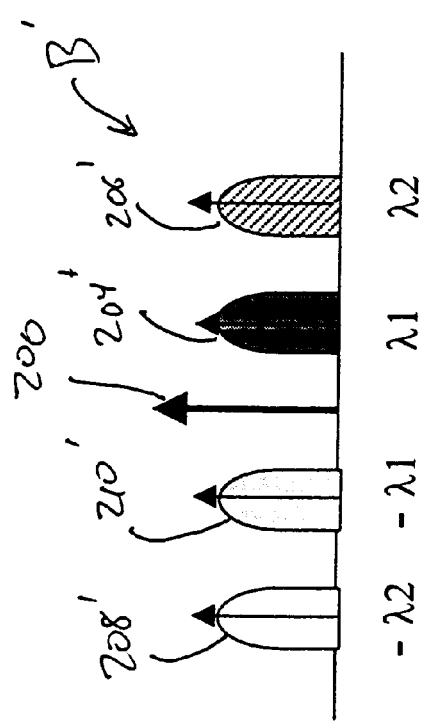
Fig. 3a
Fig. 3b

DYNAMIC WAVELENGTH ADD/DROP MULTIPLEXER FOR UDWDM OPTICAL COMMUNICATION SYSTEM

This application claims priority from U.S. Provisional Patent Application No. 60/231,577, filed Sep. 11, 2000 and entitled "Optical Add/Drop Multiplexer and In-Band Wavelength Conversion".

BACKGROUND OF THE INVENTION

1. Field of the Invention

The present invention relates generally to a method and apparatus for adding and dropping channels in an optical communications system.

2. Description of Related Art and General Background

In many applications of dense-wavelength division multiplexed (DWDM) optical systems (for example, optical computer networks, CATV (cable television) systems, and telecommunications networks), there exists a need to allow local dropping and adding of traffic carried by one or more wavelengths. Applications include when optical channels are sent to or dropped from an optical transmission line e.g., for sending optical channels to a local bus or for adding local channels to an incoming data signal. This form of optical routing may be generally referred to as "add-drop multiplexing."

While a basic optical add/drop multiplexer has been described by Taga, et al. (U.S. Pat. No. 5,822,095), it is suited to relatively wide channel spacing and is not suited to modern DWDM systems which tend to have a larger number of more narrow channels which are closely spaced. Mizrahi (U.S. Pat. No. 5,982,518) has proposed one solution for more narrow channels using sequential fiber gratings between optical circulators. In each case, however, a set of local transmitters is required to produce the added channels, increasing the cost and complexity of the add/drop node.

In each of these devices, each transmitter requires the use of a wavelength locker in order to maintain the wavelength stability of the transmitted channels. Such wavelength lockers are available which allow wavelength stability of between about 2.5 GHz and 5 GHz. However, such tolerances are only effective for use in networks having a channel spacing of about 50 GHz. When channel spacing is below about 10 GHz, currently available wavelength lockers are too imprecise to allow transmission without any interference between channels.

SUMMARY OF THE INVENTION

Embodiments of the present invention address the needs identified above and others by providing a method of optical data transmission including receiving an optical signal having a plurality of components, each component having a different wavelength, receiving an information signal, separating a first one of the components from the optical signal, dropping a second one of the components from the optical signal, modulating the first one of the components with the information signal to obtain a modulated component, and combining the modulated component with the optical signal.

Another embodiment of the present includes an add/drop device for optical data transmission including an optical waveguide configured and arranged to receive a signal having a plurality of components, each component having a different wavelength, a splitter coupled to the optical waveguide and configured and arranged to produce a first output signal and a second output signal, each output signal having the plurality of components, a first filter configured and arranged to separate a first one of the components from the first output signal, a modulator configured and arranged to modulate the first component with an information signal, a second filter configured and arranged to drop a second one of the components, different from the first component, and a combiner configured and arranged to combine the modulated first component with the filtered second output signal.

Yet another embodiment of the present invention includes a dense wavelength division multiplexed optical transmission system, including a transmitter, an optical waveguide configured and arranged to receive an optical signal from the transmitter through the transmission line, the signal having a plurality of components, each component having a different wavelength, a splitter coupled to the optical waveguide and configured and arranged to produce a first output signal and a second output signal, each output signal having the plurality of components, a first filter configured and arranged to separate a first one of the components from the first output signal, a modulator configured and arranged to modulate the first component with an information signal, a second filter configured and arranged to drop a second one of the components, different from the first component, a combiner configured and arranged to combine the modulated first component with the filtered second output signal, and a receiver in optical communication with the combiner.

BRIEF DESCRIPTION OF THE DRAWINGS

The accompanying drawings, which are incorporated in and constitute a part of this specification illustrate an embodiment of the invention and together with the description, explains the objects, advantages, and principles of the invention.

FIGS. 3a and 3b schematically illustrate a single band of an optical signal.

DETAILED DESCRIPTION OF THE PREFERRED EMBODIMENTS

In the following description, for purposes of explanation and not limitation, specific details are set forth such as particular optical and electrical circuits, circuit components, techniques, etc. in order to provide a thorough understanding of the present invention. However, the invention may be practiced in other embodiments that depart from these specific details. In some instances, detailed descriptions of well-known devices and circuits may be omitted so as not to obscure the descriptions of the embodiments of the present invention with unnecessary details.

Certain aspects of the description make mention of use of optical single sideband (OSSB) modulation or double sideband modulation. One method of optical single sideband transmission is disclosed in U.S. patent application Ser. No. 09/575,811 of Way et al., filed May 22, 2000, entitled "Method and Apparatus for Interleaved Optical Single Sideband Modulation", and herein incorporated by reference.

Other methods of optical single and double sideband modulation may be employed as appropriate.

For purposes of this specification, some channels will be referred to as having a characteristic wavelength or frequency. This does not mean that the channel is restricted to the exact recited wavelength or frequency. If the channel has a width, then the characteristic wavelength or frequency is taken to be at approximately the center of the width. If a channel is substantially monochromatic, then the characteristic wavelength or frequency will be the wavelength or frequency of the monochromatic light source.

Figure 1:
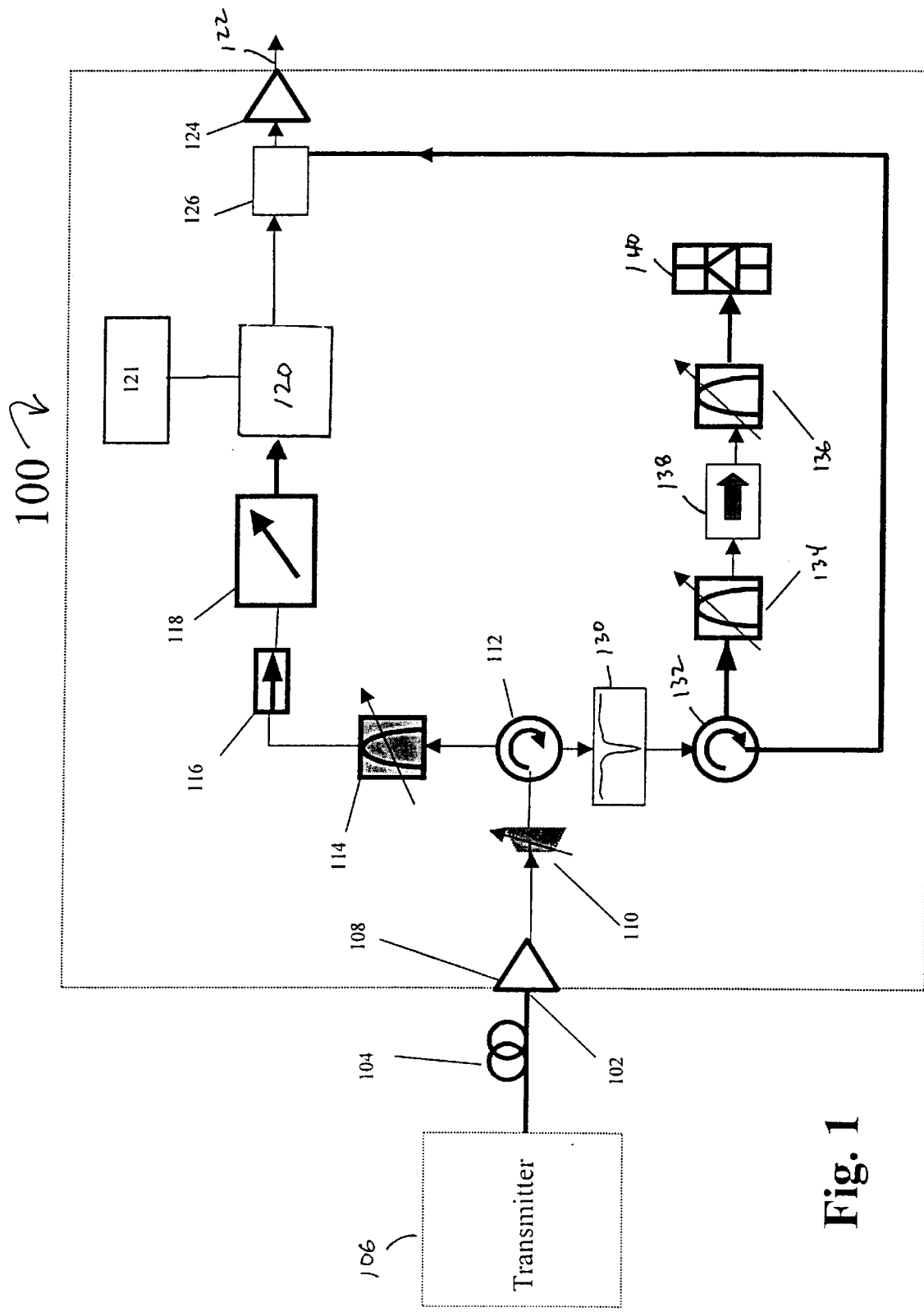
FIG. 1 is a schematic diagram illustrating an optical add/drop according to an embodiment of the present invention.

An add/drop node 100 according to an embodiment of the present invention is shown in FIG. 1. The node 100 has an input 102 which is in optical communication with an optical path 104. The optical path 104, in most cases, will be a single mode fiber forming a part of an optical communication system. A transmitter 106 is in optical communication with the optical path 104.

The input 102 may include an optical amplifier 108, such as a erbium doped fiber amplifier. Likewise, the amplifier 108 may be disposed along the optical path 104, or in both locations. An optical pre-filter 110 is in optical communication with the input 102. The optical pre-filter 110 may be, for example, a fixed or tunable filter and may have a bandwidth approximately equal to the bandwidth of a single ITU-grid window, for example, about 25–60 GHz. An optical circulator 112 in communication with the optical pre-filter 110 provides a first optical path leading to an optical filter 114. The optical filter 114 may be, for example, a tunable Fabry-Perot filter or a fiber grating based filter. An optical isolator 116 and a polarization controller 118 are disposed in the optical path between the optical filter 114 and a modulator 120. The modulator 120 may be, for example, an optical double sideband modulator, an optical single sideband modulator or an interleaved optical single sideband modulator. Note that the polarization controller 118 is of particular import only for those embodiments of the add/drop node 100 including a polarization dependent modulator 120, such as a Mach-Zehnder modulator. The modulator is in communication with a source 121 of an information signal to be added to the optical signal.

An output optical path 122 proceeds from the modulator 120 and may contain an optical amplifier 124. A combiner 126 is disposed along the output optical path 122. The combiner 126 may be any type of junction allowing optical signals from two fibers to be mixed, for example, the combiner 126 may be a 2×1 connector or a multiplexer.

A second optical path leading from the circulator 112 contains a filter 130, such as a notch filter. The filter 130 may be, for example, a band reject filter, or a pair of cascaded band reject filters, providing a deeper, narrower notch. A second circulator 132 is in optical communication with the filter 130 and is in optical communication with an optical filter 134. An additional optical filter 136 is in optical communication with the optical filter 134 and the two are separated by an optical isolator 138. The two optical filters 134, 136 may be, for example, tunable optical band pass filters. A photodetector 140 is optionally disposed in optical communication with the optical filters 134, 136. If there is no need to detect a signal passed by the filters 134, 136, a termination may be substituted for the photodetector 140. The circulator 132 is further in optical communication with the optical output path 122.

Figure 2:
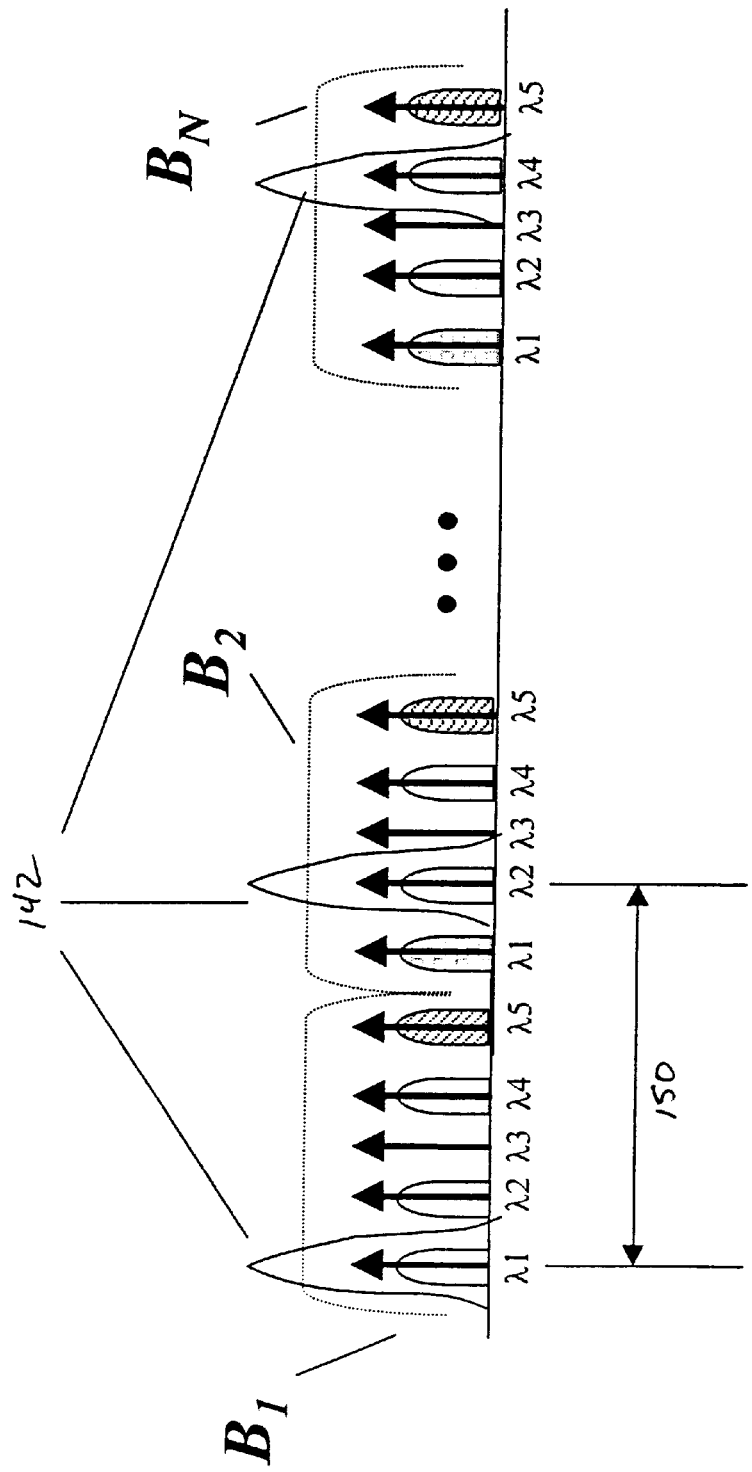
FIG. 2 schematically illustrates a broad band optical signal.

As may be seen in FIG. 2, the optical filter 134 may have a characteristic which results in a phenomenon of repeated passbands 142. Since it is undesirable to drop channels at upper or lower repeated passbands in an uncontrolled way, the optical pre-filter 110 is used to remove bands outside of the band to be processed in the add/drop node 100. Thus, it is preferable to set the bandwidth of the optical pre-filter 110 to be less than the free spectral range 150 of the optical filter 134. As a matter of convenience, the bandwidth of the optical pre-filter may be selected to be about equal to the ITU window passband of a conventional DWDM multiplexer/demultiplexer.

In operation, the add/drop node 100 receives a signal including a plurality of channels $\lambda_1 \ldots \lambda_n$. The signal may be of a bandwidth greater than a single ITU-grid window as shown in FIG. 2. The signal includes an unmodulated carrier 200 as seen in FIGS. 3a, 3b and 4.

FIG. 3a shows one band B of an interleaved optical single sideband signal in which upper sideband channels 204, 206 and lower sideband channels 208, 210 are interleaved. That is, an upper sideband channel 204 differs in wavelength from the carrier by a different amount than both lower sideband channels 208 and 210 such that a residual image of the upper sideband channel 204 will substantially not interfere with the lower channels 208 and 210. The wavelength $\lambda$ of each channel is expressed in terms of difference between the wavelength of the channel and the wavelength of the carrier. So if a channel is denoted $\lambda_1$, that means that the channel has a wavelength of $\lambda_c+\lambda_1$. Thus, in the signal of FIG. 3a, an upper sideband channel has a wavelength $\lambda_1$ and neither lower sideband channel 208, 210 has a wavelength equal to the wavelength of the carrier 200 minus $\lambda_1$. FIG. 3b shows one band B' of a double optical single sideband signal in which each upper sideband channel 204', 206' has a corresponding lower sideband channel 208', 210'. The signal 212 has a carrier 200'.

Figure 4:
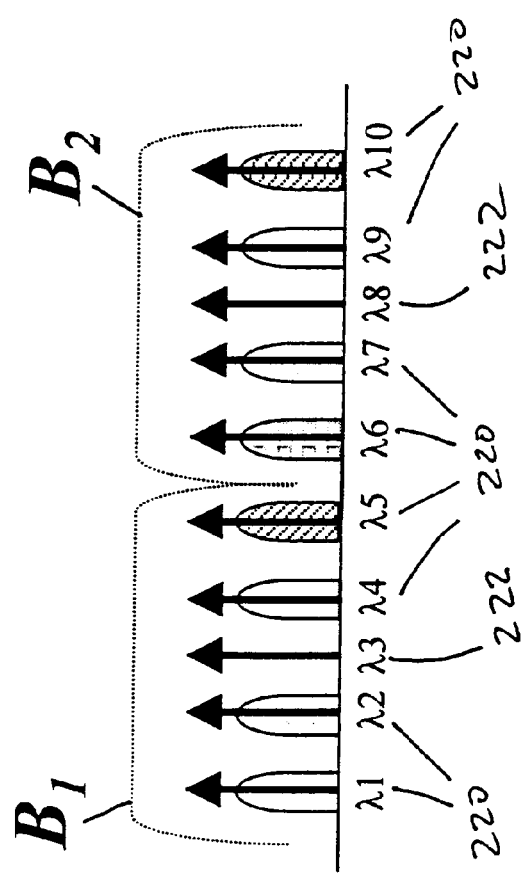
FIG. 4 schematically illustrates a broad band optical signal.

FIG. 4 shows a plurality of channels $\lambda_1 \ldots \lambda_{10}$ contained in two bands $B_1$, $B_2$ or ITU-grid windows. The channels of each band $B_1$, $B_2$ include four data channels on respective sub-carriers 220 and one continuous wave carrier 222 which is unmodulated. The signal 224 shown in FIG. 4, may represent, for example, a ultra-dense wavelength division multiplexed on-off key modulated signal (U-DWDM OOK). Though four channels are shown in each of FIGS. 3a, 3b and 4, different numbers of channels may be used, depending on the channel spacing and window size.

In operation, referring to FIGS. 1–4, add/drop node 100 an input optical signal from the transmitter 106 is received by the input 102. The input optical signal may be, for example, similar to one of those signals shown in FIGS. 3a, 3b and 4. The input signal has a plurality of components, each component having a different wavelength from the other components. The input signal is amplified by the optical amplifier 108 and continues to the optical pre-filter 110. As noted above, the optical pre-filter 110 preferably has a band pass bandwidth approximately the same as the width of a band $B_n$ of the input optical signal, e.g. about 40–80 GHz, so that only one band of the input optical signal is processed by the add/drop node 100.

The input optical signal enters the circulator 112 and passes into the upper arm of the add/drop circuit. The optical filter 114 is a band pass filter which separates one component, the unmodulated carrier 200, 200', 222, from the signal. The signal proceeds through the optical isolator 116 and the polarization controller 118 before entering the modulator 120. The modulator 120 receives an information signal and modulates the carrier 200, 200', 222 with the information signal. Preferably, the information signal is modulated onto the carrier in a channel corresponding to the channel to be dropped; it may be placed in any empty channel, or even out of band, if there is not to be interference from an adjacent band.

When the optical filter 114 passes the carrier into the upper arm, it also reflects a portion of the input optical signal, i.e. all but the optical carrier, back through the circulator 112 and into the lower arm. The notch filter 130 removes the carrier and the signal proceeds to the second circulator 132. Even in the case where the filter 114 has removed most of the carrier, there may be residual components of the carrier which should be removed by the notch filter 130. The two optical filters 134, 136 along with the optical isolator 138 act as a strong, narrow bandpass filter to extract a second component, the channel to be dropped, from the signal. The use of the two filters 134, 136 and the isolator 138 allows the dropped channel to be more completely removed from the signal, reducing residual components which might interfere with adding a new channel. The filters 134, 136 may be tunable so that any selected channel can be dropped.

In most circumstances, the dropped channel will be dropped so that it may be locally received. In those cases, a photodetector 140 is used to receive the dropped channel after it passes through the filters 134, 136. In the case that the dropped channel is being dropped simply to free bandwidth for a channel to be added and is not to be locally used, no photodetector 140 is required. A termination (not shown) should be used to ensure reflections are effectively eliminated, though this may not be necessary given the isolator 138.

The first filter 134 reflects the remaining optical signal, without the dropped channel, onward towards the output optical path 122. The signal passes through the combiner 126 where it is combined with the carrier which has been modulated with the information signal, forming an output optical signal. The output optical signal is optionally amplified by the optical amplifier 124 and is output from the add/drop node 100 for further transmission to a receiver (not shown).

Since the upper and lower arms of the circuit are recombined at the combiner 126, it is desirable to match the optical path lengths so that the output optical signal components retain similar phase relationships to each other as they had prior to processing in the add/drop node 100. This is of particular importance, for example, in a packet-switched network. In order to maintain phase relationships, delay loops, for example, can be added into whichever of the two arms has a shorter optical path.

Figure 5:
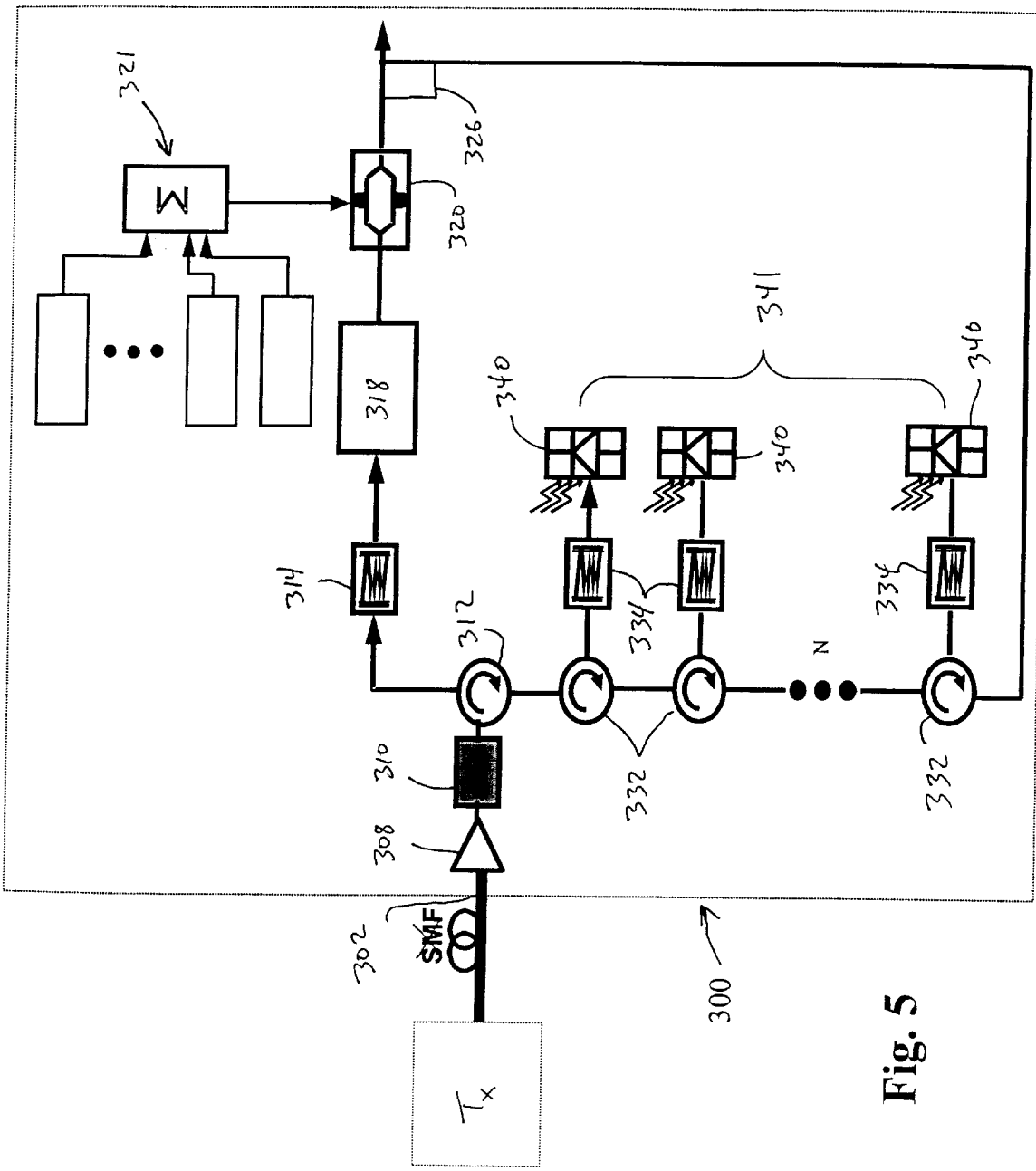
FIG. 5 is a schematic diagram illustrating an optical add/drop according to another embodiment of the present invention.

FIG. 5 shows an extension of the add/drop 100 of FIG. 1, adapted to add and drop up to N channels. The components of add/drop 300 are similar to add/drop 100. The input 302 may include an optical amplifier 308 prior to the optical pre-filter 310. The circulator 312 is in communication with an upper arm of the circuit including an optical filter 314 for separating the carrier from the optical signal. The optical filter 314 is in communication with a polarization controller 318 and a modulator 320. The modulator 320 is in communication with a separate input 321 for inputting information signals to be modulated onto the carrier as in the add/drop 100 of FIG. 1.

In the lower arm, a series of drop filters 334 and photodetectors 340 are used to drop each channel to be dropped. As can be seen, circulators 332 are used to direct the signal into each drop filter 334 seriatim. Though drop filters 334 are shown as a single component in FIG. 5, they may be understood to encompass an arrangement such as that shown in FIG. 1, each filter 334 including two bandpass filters in conjunction with an optical isolator. N sets 341 of filters 334 and photodetectors 340 are provided to drop N channels.

At the junction of the two arms, a combiner 326 is provided to combine the two signals for output.

The operation of the add/drop 300 may be understood from the operation of the add/drop 100 described above without further explanation. There is some upper limit on the number of channels N which can be added at each add/drop 300. Though, in theory, the number of drops could be extended without a practical limit, the adding modulator generally has a maximum bandwidth. The maximum number of added channels may be derived from the maximum bandwidth, the channel width and the channel spacing and will depend on the application, as well as changes in standards and technologies.

Embodiments of the present invention find uses, for example, in all-optical, packet-switched networks having fast optical switches and routers in the core or circuit-switched networks with relatively slow optical cross-connects for providing traffic re-routing or protection functions. Such networks may be used as telecommunications networks carrying voice and/or data, CATV networks or other such applications.

While the invention has been described in connection with particular embodiments, it is to be understood that the invention is not limited to the disclosed embodiments, but on the contrary it is intended to cover various modifications and equivalent arrangement included within the spirit and scope of the claims which follow.

We claim:

1. A method of optical data transmission comprising;
    receiving an optical signal having a plurality of components, each component having a different wavelength;
    receiving an information signal;
    separating a first one of the components from the optical signal the first one being a CW carrier without optical modulation;
    dropping a second one of the components from the optical signal as a drop optical signal while keeping a remainder of the optical signal;
    modulating the first one of the components with the information signal to obtain a modulated component carrying a newly added signal from the information signal; and
    combining the modulated component with the remainder of the optical signal to produce a new optical signal.

2. A method as in claim 1, further comprising setting a frequency of the modulated component either at a frequency of the dropped second one of the components or at a frequency that is not occupied by the components in the optical signal in modulating the first one of the components with the information signal to obtain the modulated component.

3. A method as in claim 1, wherein each of the components is carried within a single band centered at an ITU wavelength grid.

4. A method as in claim 3, further comprising applying an optical single sideband sub-carrier modulation to obtain the components that are respectively at different sub-carriers within the one ITU wavelength grid.

5. A method as in claim 3, further comprising applying an optical double sideband sub-carrier modulation to obtain the components that are respectively at different sub-carriers within the one ITU wavelength grid d.

6. A method as in claim 1, wherein the modulating of the first one of the components is carried out to further obtain at least another modulated component carrying a second newly added signal from the information signal.

7. A method as in claim 1, further comprising dropping a third one of the components from the optical signal as a second drop optical signal while keeping a remainder of the optical signal.

8. An add/drop node for an optical transmission system, comprising:
- an optical prefilter;
- a first tunable optical filter in optical communication with the optical prefilter to receive an optical signal having a continuous wave carrier signal therefrom, the tunable filter being selectively tunable to transmit a selected pass band of the optical signal and to reflect a portion of the optical signal;
- a modulator, configured and arranged to modulate the transmitted pass band from the first tunable filter with an information signal, the information being transmitted in a selected band;
- a notch filter in optical communication with the first tunable optical filter to receive the reflected portion of the optical signal and being selectively tunable to transmit the reflected portion of the optical signal after filtering the continuous wave carrier therefrom to produce a filtered reflected optical signal;
- a drop filter in optical communication with the the notch filter and configured and arranged to transmit a selected pass band of the filtered reflected optical signal as a drop optical signal and to reflect the remainder of the filtered reflected optical signal as a twice filtered reflected optical signal; and
- a combiner in optical communication with the drop filter and configured and arranged to accept the twice filtered reflected optical signal and the modulated transmitted pass band and to transmit an output signal.

9. A device as in claim 8, wherein the modulator is an optical single sideband modulation modulator to produce an unmodulated carrier and a plurality of modulated subcarriers with single sidebands.

10. A device as in claim 8, wherein the modulator is an optical double sideband modulation modulator to produce an unmodulated carrier and a plurality of modulated subcarriers with double sidebands.

11. A device as in claim 8, wherein the modulator is adjusts a spectral center of the selected band to be out of band.

12. A device as in claim 8, wherein the modulator operates to adjust a spectral position of the center of the selected band.

13. A device as in claim 12, wherein the modulator adjusts a spectral center of the selected band to be at a frequency of the drop optical signal.

14. A device as in claim 12, wherein the modulator adjusts a spectral center of the selected band to be at a frequency of an empty channel.

15. An optical add/drop device, comprising:
- an optical input port to receive light having a CW carrier at a carrier frequency and a plurality of optical channels at channel frequencies different from the carrier frequency;
- a first optical path comprising a bandpass optical filter to transmit light at the carrier frequency to produce a CW Light beam at the carrier frequency and reflect the optical channels, and an optical modulator to modulate the CW light beam to carry an add optical channel at a selected add channel frequency as a first output beam;
- a second optical path comprising at least a first optical drop filter to select one of the optical channels to transmit as a first optical drop signal and to reflect other optical channels as a second output beam;
- an optical router in optical communication with the optical input port, the first and the second optical paths to direct light from the optical input port to the first optical path and to direct reflected light from the first optical path to the second optical path; and
- an optical combiner to combine the first and the second output beams into an output beam.

16. The device as in claim 15, wherein the bandpass optical filter is a tunable filter.

17. The device as in claim 15, wherein the first optical drop filter is a tunable filter which operates to select an optical channel among optical channels received in the second optical path to drop as the first optical drop signal.

18. The device as in claim 15, further comprising a second optical drop filter in the second optical path to select another of the optical channels in the second output beam to transmit as a second optical drop signal and reflects remaining optical channels as the second output beam to the optical combiner.

19. The device as in claim 15, wherein the optical modulator operates to modulate the CW light beam to carry the add optical channel at the selected add channel frequency and a second add optical channel at a second selected add channel frequency as the first output beam.

20. The device as in claim 15, wherein the optical modulator comprises a Mach-Zehnder modualator.

21. The device as in claim 15, wherein the optical modulator is an optical single sideband modulation modulator.

22. A device as in claim 15, wherein the optical modulator is an optical double sideband modulation modulator.

* * * * *